United States Patent
Doublet et al.

(10) Patent No.: US 12,173,409 B2
(45) Date of Patent: Dec. 24, 2024

(54) METHOD FOR DEPOSITING A COATING FROM AN IMPROVED COMPOSITION SUSPENSION

(71) Applicants: L'Air Liquide Société Anonyme pour l'Etude et l'Exploitation des Procédés Georges Claude, Paris (FR); Centre National de la Recherche Scientifique, Paris (FR); Université de Lorraine, Nancy (FR)

(72) Inventors: Sébastien Doublet, Vauhallan (FR); Nicolas Ramenatte, Jouy-en-josas (FR); Stéphane Mathieu, Villers les Nancy (FR); Michel Vilasi, Bouxieres aux Dames (FR); Léo Portebois, Nancy (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 5 days.

(21) Appl. No.: 17/772,659

(22) PCT Filed: Oct. 16, 2020

(86) PCT No.: PCT/EP2020/079286
§ 371 (c)(1),
(2) Date: Apr. 28, 2022

(87) PCT Pub. No.: WO2021/083694
PCT Pub. Date: May 6, 2021

(65) Prior Publication Data
US 2022/0396885 A1 Dec. 15, 2022

(30) Foreign Application Priority Data
Oct. 28, 2019 (FR) ...................................... 1912028

(51) Int. Cl.
*C23C 24/08* (2006.01)
(52) U.S. Cl.
CPC .................................. *C23C 24/087* (2013.01)
(58) Field of Classification Search
CPC .................................................... C23C 24/087
See application file for complete search history.

(56) References Cited

U.S. PATENT DOCUMENTS

| 3,869,293 | A | * | 3/1975 | Brumbaugh | ............ | C23C 22/74 |
| | | | | | | 427/376.6 |
| 2007/0009660 | A1 | * | 1/2007 | Sasaki | ..................... | F01D 5/005 |
| | | | | | | 427/140 |

(Continued)

FOREIGN PATENT DOCUMENTS

| EP | 2 392 685 | 12/2011 |
| WO | WO 2014 125188 | 8/2014 |
| WO | WO 2015 044559 | 4/2015 |

OTHER PUBLICATIONS

International Search Report for corresponding PCT/EP2020/079286, Nov. 6, 2020.

*Primary Examiner* — Robert A Vetere
(74) *Attorney, Agent, or Firm* — Elwood L. Haynes

(57) ABSTRACT

A process for the deposition of a coating on at least a part of a metallic substrate, a) mixing a liquid and a powder having particles of a metallic material to be deposited and particles of a pickling agent, so as to prepare a suspension, b) application of the suspension prepared in step a) to at least a part of the surfaces of the metallic substrate, so as to obtain a substrate-suspension assembly, c) carrying out a heat treatment of the assembly which includes heating at a first temperature of at least 500° C. and heating at a second temperature greater than the first temperature, and d) recovery of a substrate coated, at least in part, with a coating, the pickling agent being a halogenated compound and the (Continued)

suspension having from 10% to 60% of the pickling agent, with respect to the total weight of the powder.

18 Claims, 3 Drawing Sheets

(56) References Cited

U.S. PATENT DOCUMENTS

| | | | |
|---|---|---|---|
| 2007/0031240 A1* | 2/2007 | Nichols | F01D 11/08 415/115 |
| 2011/0300405 A1* | 12/2011 | Goller | C23C 10/20 428/650 |
| 2015/0376757 A1* | 12/2015 | Richet | C23C 2/04 427/380 |
| 2016/0237574 A1 | 8/2016 | Chartier et al. | |
| 2016/0348216 A1* | 12/2016 | Szuromi | F01D 5/28 |

* cited by examiner

METHOD FOR DEPOSITING A COATING FROM AN IMPROVED COMPOSITION SUSPENSION

CROSS REFERENCE TO RELATED APPLICATIONS

This application is a 371 of International Application No. PCT/EP2020/079286, filed Oct. 16, 2020, which claims priority to French Patent Application No. 1912028, filed Oct. 28, 2019, the entire contents of which are incorporated herein by reference.

BACKGROUND

The present invention relates to the production of a protective coating on a substrate, said coating being in particular capable of protecting and intended to protect at least a part of the surface of the substrate against corrosion.

The invention applies in particular to the deposition of a coating on a substrate exhibiting one or more cavities which are difficult to access. Thus, the substrate can be at least a part of an exchanger-reactor, the cavities being formed by millimetric channels intended for the circulation of the various fluids within the exchanger-reactor.

The invention can also apply to the deposition of a coating on components intended for the aeronautical industry, such as turbine components, in particular components comprising millimeter-sized cooling channels and/or zones which are difficult to access.

In a context of intensification of industrial processes used by the oil and chemical industries, the engineering departments concerned are seeking to improve the efficiency of the units which they design. In order to increase the efficiency, the approach followed during the development of new production units is the replacement, when possible, of exchangers and reactors by devices of the type of structured exchangers or exchanger-reactors.

These exchangers or exchanger-reactors make it possible to have much more efficient mass and heat transfers due to their high volume to surface area ratio. In addition, they make possible good thermal and structural stability and finer control of the operating conditions of the process, resulting in a higher production yield. These devices generally consist of assembled grooved plates, constituting channels of millimetric size.

The latest technological advances relating to the manufacture of metal components by additive processes make it possible to design high-efficiency reactor-exchangers while minimizing their dimensions. One of the additive manufacturing techniques, also called 3D printing, is powder bed fusion which confers, on the material, greater exchange surface areas resulting from a high surface roughness. The expanded surface area is approximately 1.4 times greater than that obtained by "conventional" manufacturing processes, thus accentuating the heat exchange. When this manufacturing technology is used, a post-heat treatment operation is often undertaken so as definitively to consolidate the component and to stabilize the microstructure. This hinges on a heat treatment under inert gas pressure at high temperature. The low oxygen pressure present in the inert gas is sufficient all the same to form an oxide layer of a few microns at the surface of the components. In the processes according to the prior art, this oxide layer forms an interdiffusion barrier between the metallic material to be deposited and the constituent material of the substrate to be coated, preventing the deposition of protective coatings without a prior pickling step for the conventional deposition processes.

In the case of exchangers or exchanger-reactors used in hydrocarbon cracking or reforming processes, such as, for example, the steam methane reforming process employed for the industrial production of synthesis gas, the walls of the channels of the exchangers or exchanger-reactors must be covered with a protective coating so as to block the catastrophic effects of the significant carbon activity which prevails within these processes. These conditions are the cause of "metal dusting" phenomena, characterized by a disintegration of the alloys into particles of metal and graphite, thus resulting in the ruin of these exchangers or exchanger-reactors if they are not protected.

The protective coatings used can be based on aluminum or chromium so as to develop protective layers of stable oxides of alpha-$Al_2O_3$ or $Cr_2O_3$ type. In general, aluminum or chromium is deposited in the gas phase, an operation which is also denoted by gas-phase aluminization or chromization. The aluminum or chromium oxide is subsequently obtained either by a specific oxidation step in a furnace under controlled or uncontrolled oxygen partial pressure, or by directly using the exchanger or exchanger-reactor under an oxidizing atmosphere.

Vapor phase deposition techniques using a gaseous precursor of the coating to be produced are known. This precursor can be produced in close proximity to the surface to be coated, as is the case with the box carburizing process, also called pack carburizing or "in-pack" carburizing, or be transported via a carrier gas to the surface to be coated, as is the case with "out-of-pack" carburizing processes, which can be carried out by natural convection or with forcing of the passage of the carrier gas into hollow cavities to be protected.

The main difficulties encountered for box carburizing are related to the filling of components exhibiting a complex geometry or very small dimensions (a few mm) with the cement powder (precursor mixture of the coating). The main limitations of the techniques using gaseous precursors relate to the rapid depletion of the gas mixture in reactive entities, resulting in heterogeneities in chemical composition and/or in thickness of the coating. It remains very difficult to obtain a homogeneous coating over long lengths of hollow cavities or on surfaces which are difficult to access.

Liquid-phase deposition techniques based on the use of suspensions containing reactants mixed in a liquid phase called solvent are furthermore known. These techniques employ a procedure comprising the preparation of the suspension, its application and a heat treatment.

In addition to difficulties in being injected into cavities of small sizes and having complex geometries, some known suspensions involve constituents incompatible with European regulations concerning the registration, the evaluation and the authorization of chemical substances, as well as the restrictions applicable to these substances ("REACH" regulation, EC 1907/2006), such as chromates.

Other existing suspensions are of complex formulation or involve additional steps of preparation of the substrate. Thus, the document EP-A-2 956 565 discloses a process for the deposition of a coating requiring, before applying the suspension, a step of pickling the surface of the substrate to be coated and, after the heat treatment of the substrate-suspension assembly, a step of removal of powdery residues. EP-A-3 049 545 discloses a process employing a suspension comprising a protective agent for the metal powder to be deposited, a diluent and at least one additive which promotes the wetting of the surface to be coated. Following the application of the suspension, this process requires steps for removal of the solvent and the organic compounds used for suspending the powders.

In addition to their complexity of use or of formulation, these formulations are not entirely satisfactory, in particular on certain components of complex geometry and/or exhibiting cavities having high length/width or length/depth aspect ratios and/or a high surface roughness, for which the components may here and there exhibit absences of coatings or an uneven thickness of the coating.

SUMMARY

The aim of the present invention is to solve all or part of the abovementioned problems, in particular by providing an improved process for the deposition of a coating on a substrate making possible the production of a coating of more homogeneous thickness with a greater degree of coverage, on surfaces having high roughnesses, exhibiting defects of oxide or unfused type and/or which are difficult to access, in particular on substrates exhibiting at least one cavity with a characteristic size of the order of a millimeter and with high length/width and/or length/depth ratios, and the implementation of which on the industrial scale is greatly simplified compared to the prior art.

The solution according to the invention is then a process for the deposition of a coating on at least a part of a metallic substrate, said process comprising the following successive steps:
  a) mixing a liquid and a powder comprising particles of a metallic material to be deposited and particles of a pickling agent, so as to prepare a suspension,
  b) application of the suspension prepared in step a) to at least a part of the surfaces of the metallic substrate, so as to obtain a substrate-suspension assembly,
  c) carrying out a heat treatment of the substrate-suspension assembly which comprises heating at a first temperature of at least 500° C. and heating at a second temperature which is greater than the first temperature, and
  d) recovery of a substrate coated, at least in part, with a coating,
said pickling agent being a halogenated compound and the suspension comprising from 10% to 60% by weight of said pickling agent, with respect to the total weight of the powder.

The use of a suspension containing a halogenated compound in the content according to the invention makes it possible to dispense with the pickling step which usually precedes the application of the suspension to the substrate to be coated and to obtain complete or virtually complete coverage of the surface to be coated, typically a degree of coverage of greater than 99%, preferably equal to 100%, this being achieved without it being necessary to carry out the removal of the residues before recovery of the coated substrate.

The use of a halogenated compound as pickling agent makes it possible to destabilize in situ oxides and/or organic compounds, such as fats, oils, adjuvants, liquid residues, present at the surface of the substrate. Thus, during the temperature rise carried out during the heat treatment of the substrate-suspension assembly, the pickling agent changes from the solid state to the liquid state, which makes it possible to carry out a dissolution of the surface oxides by molten halogenated salts. When the pickling agent changes to the gaseous state, it makes it possible to degrade the surface oxides by gas-phase transportation mechanisms. Pickling is thus carried out in situ during the heat treatment of the substrate, and not prior to this, which makes it possible for the surfaces to be coated to be reactive whatever their initial surface state.

In addition, in the gaseous state, the halides contained in the pickling agent react with the powder of the metal or of the alloy to be deposited and create a vapor phase which, by gas-phase diffusion mechanisms, ensures a greater degree of coverage and better accessibility to zones of complex geometry and/or high aspect ratios. The pickling agent thus acts as transportation agent.

The content of the powder in the stripping agent, which can also be expressed in the form of metallic material/pickling agent ratio by weight, is also determined so that all of the compounds introduced into the suspension are used by the process, in particular via the formation of gaseous entities during the heat treatment. In other words, by using the halogenated compound in the contents according to the invention, it is possible to adjust the amount of reactants involved with respect to the stoichiometry of the chemical reaction with the oxides and/or the organic compounds initially present at the surface of the substrate. This formulation thus makes it possible to obtain a total transformation of all the constituents of the suspension, without powdery residues remaining after the heat treatment of the substrate. The coated component can thus be put into service immediately after the application of the coating.

As the case may be, the invention can comprise one or more of the following characteristics:
  the suspension comprises from 20% to 30% by weight of said pickling agent, with respect to the total weight of the powder,
  the powder contains solely particles of the metallic material and particles of the pickling agent,
  the powder is free of any binding compound or agent,
  the particles of the metallic material exhibit a first mean equivalent diameter and the particles of the pickling agent exhibit a second mean equivalent diameter, the ratio of the first mean equivalent diameter to the second mean equivalent diameter being between 1.2 and 10, preferably between 3.5 and 7.5,
  the particles of the metallic material exhibit a first mean equivalent diameter of between 7 and 15 µm and/or the particles of the pickling agent exhibit a second mean equivalent diameter of between 2 and 6 µm,
  the particles of the metallic material exhibit a first particle size distribution centered around the first mean equivalent diameter and the particles of the pickling agent exhibit a second particle size distribution centered around the second mean equivalent diameter, said first particle size distribution and/or said second particle size distribution exhibiting a dispersion index of less than 1.2, preferably of less than 1.13, more preferably of less than 0.9,
  the particles of the suspension exhibit a mean sphericity factor of at least 0.3, preferably of at least 0.5,
  the metallic substrate exhibits at least one cavity of equivalent diameter $e_{mm}<2$ mm and/or a length/width ratio of greater than 150, the particles of the suspension each exhibiting an equivalent diameter of less than $e_{mm}/10$,
  the coating obtained in step d) exhibits a mean thickness of between 15 and 200 µm, preferably of between 30 and 60 µm, and variations in thickness of less than 10% in relative standard deviation, preferably of less than 5%, the relative standard deviation being defined as the ratio of the standard deviation of the thickness to the mean thickness, the ratio by weight of the powder to the liquid is between 1.5 and 3, the pickling agent is a halogenated compound, the halogen of which is fluorine or chlorine, the pickling agent belongs to the system of fluorinated compounds, said pickling agent preferably being chosen from the group consisting of $K_xAlF_y$, $NH_4F$, $MgF_2$ and $CaF_2$, preferably with x between 1 and 3 and y between 4 and 6, the liquid comprises an alcohol, the liquid preferably being ethanol, the metallic material to be deposited comprises aluminum or an aluminum alloy, the powder comprises at least 97%, preferably at least 99%, preferably at least 99.5%, by weight of particles of one and the same metal or alloy, in particular aluminum or an aluminum alloy, with respect to the total weight of the particles of metallic material, in step c), heating is carried out at a first temperature of between 500° C. and 700° C. for 1 to 4 hours and heating is carried out at a second temperature of between 900° C. and 1100° C. for 1 to 3 hours, step c) is carried out under an inert or reducing atmosphere or under vacuum, the process comprises, between steps c) and d), a step e) of carrying out, under an oxidizing atmosphere, an additional heat treatment with heating at a third temperature of between 900° C. and 1100° C. for 1 to 5 hours, the metallic material to be deposited is aluminum or an aluminum alloy, the suspension is used for the preparation of a coating which protects from corrosion, the suspension employed in the context of the invention has similar characteristics to a paint, the substrate to be coated is a metallic component exhibiting a surface roughness of at least 20 μm and/or surface defects of oxide or unfused type, the substrate to be coated is a component resulting from an additive manufacturing process, preferably a powder bed laser fusion process.

According to another aspect, the invention relates to a substrate coated, at least in part, with a coating obtained by a process according to the invention, characterized in that the coated part of said substrate exhibits a degree of coverage of its surface of greater than 99%, preferably of greater than 99.5%, more preferably equal to 100%.

In particular, the substrate is or forms part of a heat exchanger or of an exchanger-reactor. The substrate can also be or form part of a turbine.

Furthermore, the coating obtained in step d) can exhibit a mean thickness of between 15 and 200 μm, preferably of between 30 and 60 μm, and variations in thickness of less than 10% in relative standard deviation, preferably of less than 5%, the relative standard deviation being defined as the ratio of the standard deviation of the thickness to the mean thickness.

Furthermore, the invention relates to an exchanger-reactor or exchanger comprising a plurality of walls stacked parallel to one another and to a stacking direction so as to define, between them, at least a first series of stages configured for the flow of a first fluid to be placed in indirect heat exchange connection with a second fluid, at least one stage of the first series comprising a plurality of channels configured for the flow of the first fluid, said channels exhibiting a coating obtained by the process according to the invention with a degree of coverage of the surface of said channels of greater than 99%, preferably of greater than 99.5%, more preferably equal to 100%.

BRIEF DESCRIPTION OF THE DRAWINGS

A better understanding of the present invention will now be obtained by virtue of the following description, given solely by way of nonlimiting example and made with reference to the appended figures, among which.

DETAILED DESCRIPTION OF PREFERRED EMBODIMENTS

Figure 1:
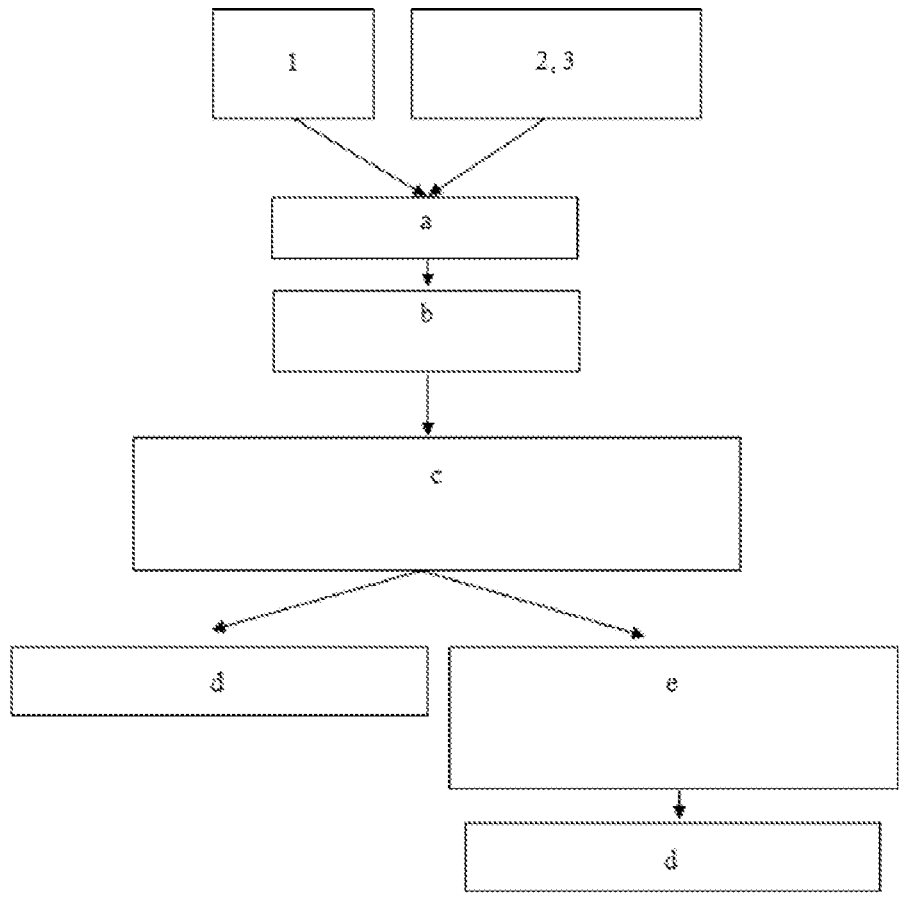
FIG. 1 diagrammatically represents the different steps of a method according to one embodiment of the invention.

As seen in FIG. 1, the first step of the process a) is the preparation of a suspension from a liquid 1, i.e. the solvent, and a powder forming the dry matter to be incorporated in the solvent. The powder comprises particles of the metallic material to be deposited 2 and particles of the pickling agent 3.

Advantageously, the powder contains solely particles of the metallic material to be deposited and particles of the pickling agent. As the pickling agent performs both the functions of pickling agent and of transportation agent, no additive or activating agent is necessary. The suspension thus consists of the liquid, the metallic material and the pickling agent. The formulation of the suspension is thus greatly simplified.

According to the invention, the suspension comprises from 10% to 60% by weight of said pickling agent, with respect to the total weight of the powder. Preferably, the suspension comprises from 20% to 30% by weight of said pickling agent, with respect to the total weight of the powder.

It should be noted that the ratio by weight of the metallic material to the pickling agent will be adapted according in particular to the metallurgical quality of the powder and the substrate, in particular the thickness of oxides which are present at the surface, and the thickness of coating to be deposited. In particular, the greater the initial thicknesses of oxides which are present at the surface of the powder or substrate, the greater the amount of pickling agent.

The pickling agent can be a halogenated compound, the halogen of which is fluorine or chlorine. Advantageously, fluorine among the halogens is used in view of its strongest electronegativity, in particular compared with that of oxygen. It will thus favorably combine with all the chemical elements present in the system of the fluorides. In particular, it will be possible to use a halogenated compound of formulation $K_xAlF_y$, with x ranging from 1 to 3 and y ranging from 4 to 6. This formulation offers the advantage of exhibiting a high activity range over a wide temperature range.

It is also in accordance with the REACH regulations (EC 1907/2006).

It will also be possible to envisage the use as pickling agent of the following compounds: $NH_4F$, $MgF_2$ and $CaF_2$.

The metallic material 2 can be formed, in all or part, of a simple substance or of an alloy. Preferably, the metallic material is formed, in all or part, of aluminum or of an aluminum alloy.

It should be noted that the term "metallic material" is understood to mean any metallic substance used to form the coating. The powder can thus comprise particles of one and the same metal or alloy, possibly with particles of other metals or alloys. Preferably, the powder comprises at least 97%, preferably at least 99%, by weight of particles of one and the same metal or alloy, with respect to the total weight of the particles of metallic material.

Preferably, the metallic material is such that the coating obtained is a coating which protects the substrate from corrosion.

Preferably, the liquid is formed of alcohol, in particular of ethanol. There is no oxidation reaction of the metallic material in ethanol, which makes it possible to prepare suspensions which are stable over the long term. In addition, ethanol can be easily employed on the industrial scale and its use is the most compatible with the REACH regulations.

After mixing the liquid and the powder, the suspension is applied (step b)) to at least a part of the surfaces of the metallic substrate, so as to obtain a substrate-suspension assembly.

It should be noted that the use of a pickling agent according to the invention makes it possible to apply the suspension directly after preparation to surfaces to be coated in rough manufactured state. This thus eliminates the tedious pickling, cleaning and drying steps which were implemented in the prior art.

Advantageously, the suspension is prepared during step a) from particles, the particle size distribution of which is controlled and appropriate to the targeted application, in particular to the location, geometry and/or surface state of the substrate to be coated. The preparation of the suspension can thus comprise a grinding step during which the particles of the powder are ground in order to obtain an appropriate particle size distribution of said particles.

Preferably, the particles of the metallic material to be deposited exhibit a first mean equivalent diameter and the particles of the pickling agent exhibit a second mean equivalent diameter.

The term "equivalent diameter" of a nonspherical particle is understood to mean, in the present patent application, the diameter of the sphere of the same volume as said particle. The term "mean equivalent diameter" is understood to mean the equivalent diameter given by the statistical particle size distribution to half of a population of particles, denoted D50. Thus, D50 is the diameter of the particles for which 50% (% by weight) of the particles of the population under consideration have a diameter of less than D50. The equivalent diameters can be determined experimentally, for example by laser particle size analysis, in particular by means of a laser particle sizer of Malvern or Coulter type.

Advantageously, the ratio of the first mean equivalent diameter to the second mean equivalent diameter is between 1.2 and 10, preferably between 3.5 and 7.5.

This relative proportioning of the particles of the metallic material and of the pickling agent promotes, by steric effect, a better dispersion of these particles of different size within one and the same suspension. A more homogeneous distribution of the solid precursors in the suspension is thus obtained, which limits the presence of agglomerates in the suspension and thus the risk of clogging of the cavities to be coated and/or of excess thicknesses of deposited coating. The flow and wetting characteristics of the suspension are also found to be improved thereby, favoring a homogeneous distribution of the suspension over the surface to be coated and thus the production of a coating of controlled thickness with a high degree of coverage, indeed even complete coverage, of said surface.

In this way, the pickling agent also provides a steric dispersion function, making it possible to limit the amount and the number of reactants used in the suspension. In particular, it is thus no longer necessary to add organic compounds (of binding, dispersing, complexing, wetting or plasticizing type and the like), as was often the case in the prior art.

Furthermore, powders with a mean diameter 10 times smaller than the mean equivalent diameter of the cavity or cavities to be coated are preferably used.

The invention can apply in particular to cavities to be coated which can exhibit equivalent diameters of less than 2 mm, indeed even of less than 0.5 mm.

More particularly, the particles of the metallic material to be deposited can exhibit a first mean equivalent diameter of between 7 and 15 μm and/or the particles of the pickling agent can exhibit a second mean equivalent diameter of between 2 and 6 μm, These particle sizes are advantageous because they make it possible to obtain the best possible degree of coverage, that is to say a degree of at least 99%, preferably of at least 99.9%, more preferably equal to 100%, in particular when the substrate exhibits cavities of small dimensions or with high size ratios or when the substrate exhibits a high surface roughness.

Preferably, the particles of the metallic material to be deposited exhibit a first particle size distribution centered around the first mean equivalent diameter and the particles of the pickling agent exhibit a second particle size distribution centered around the second mean equivalent diameter. The term "particle size distribution" is understood to mean the statistical distribution of the particle diameter of a population of particles, that is to say of a set of values of diameters of particles. In the context of the invention, the powder comprises a population of particles of metallic material and a population of particles of pickling agent, each of these populations being centered on a predetermined mean equivalent diameter.

Preferably, said first particle size distribution and/or said second particle size distribution exhibit(s) a dispersion index of less than 1.13, preferably of less than 0.9. The possible size range of the particles around the mean diameter is thus limited in order to avoid having too great a difference in size between these particles and also excessively coarse or excessively fine particles.

It should be noted that "dispersion index" of a population of particles is understood to mean, within the meaning of the present patent application, the ratio A as defined below:

$$A = \frac{D90 - D10}{2 \times D50}$$

where D90 is the diameter of the particles for which 90% (% by weight) of the particles have a diameter of less than D90 and D10 is the diameter of the particles for which 10% (% by weight) of the particles have a diameter of less than D10.

It should be noted that the particles of the suspension are generally of nonspherical shape but advantageously exhibit an overall shape relatively close to that of a sphere; in particular, the particles of the suspension can be of substantially spherical or quasispherical shape.

The degree of nonsphericity of a particle can be measured by a "sphericity factor" parameter corresponding, in the present patent application, to the ratio of the smallest dimension to the largest dimension of the particle in question. Advantageously, the particles of the powder exhibit a sphericity factor of greater than 0.3, preferably of greater than 0.5. This is because it has been demonstrated, by rheological measurements of the flow characteristics of the suspension, that a morphology of particles which is too far from sphericity results in the appearance of threshold flow stresses of the suspension on the substrate, which can cause excess thicknesses of the coating.

Preferably, the ratio by weight of the powder to the liquid of the suspension is between 1.5 and 3. These values make it possible to obtain a suspension of relatively low viscosity, which promotes the complete or virtually complete covering of the surface to be coated and facilitates the application of the suspension, in particular in the case of an application by immersion or with a spray gun. Preferably, the suspension prepared in the process of the invention exhibits a viscosity of less than 1 Pa·s, preferably of between 0.1 and 1 Pa·s.

It should be noted that step a) can optionally comprise a step of agitation of the liquid-powder mixture by exposure of the liquid-powder mixture to ultrasound with a power of between 100 and 200 W, preferably for a period of time of between a few seconds and several tens of minutes.

In step b), the suspension can be applied by different techniques, resulting in the deposition of a homogeneous film on the exposed surfaces. The suspension can be applied by immersion of the substrate in the suspension, which is a simple technique, but in this case the deposition is carried out inside and outside the substrate. One or more successive dipping operations can be carried out. The suspension can also be applied by forced injection, a technique particularly suitable for the coating of internal cavities, or by application with a brush or with a spray gun.

The determination of the thickness of the deposited suspension before diffusion heat treatment is important because it conditions the amount of metallic material provided at the surface of the substrate.

For an application by dipping or by injection, this can be determined via a graph making it possible to correlate the thicknesses deposited as a function of the number of dipping operations, of the drawing rate for an optimized stirring time, for example 12 s for a suspension of 200 ml.

In the case of an application with a spray gun, the thickness of the deposit depends on various parameters: the number of passes, the rheology of the suspension or the speed of passage. By way of example, a suspension exhibiting a powder/liquid ratio by weight equal to 3 applied with a spray gun with a speed of passage of 0.5 m·s$^{-1}$ leads to uptakes in weight of the order of 20 mg·cm$^{-2}$ for a tailored flow rate.

Whatever the technique used, the zones which should not be covered can either be protected by a mask, which will be removed before or during the heat treatment for deposition of the coating, or preserved by filling up to a desired level, for example by continuous volume monitoring via a positive displacement pump.

It should be noted that, unlike certain processes of the prior art, it is not necessary to carry out a stage of removal of the solvent at low temperature (150° C. maximum) or of removal of the organic compounds after the application of the suspension.

A "diffusion" heat treatment (step c)) is proceeded to directly, which makes it possible to cause the deposit obtained previously to react with the surfaces of the substrate to be coated, resulting in the diffusion of the metallic material which it contains into the substrate and thus in the growth at the surface of the substrate of a coating enriched in this metallic material.

This treatment comprises heating at a first temperature of at least 500° C. in order to activate the pickling agent and heating at a second temperature greater than the first temperature in order to make possible the interdiffusion of the elements of the substrate with those of the suspension deposited on the substrate, which has the effect of consolidating the coating. Preferably, the treatment comprises a first heating at a first temperature of between 500° C. and 700° C. for 1 to 4 hours and a second heating at a second temperature of between 900° C. and 1100° C. for 1 to 3 hours.

Step c) can be carried out under an inert or reducing atmosphere or under vacuum, in static or dynamic conditions; preferably, it is carried out under an atmosphere under very low total pressure so as to activate the passage into the vapor phase of the halogenated compound.

Optionally, the process can comprise, after step c), a step e) carried out under an oxidizing atmosphere, for example under air, and comprising an additional heat treatment with heating at a third temperature of between 900° C. and 1100° C. for 1 to 5 hours. This additional treatment makes it possible to form an oxide layer consisting of the deposited metallic material (for example protective layers of stable oxides of alpha-Al$_2$O type) which is continuous and with a thickness of a few microns, before putting the coated component into service. This is useful when the actual operating conditions of the coated component do not make it possible to form these protective oxide layers in situ.

Figure 2:
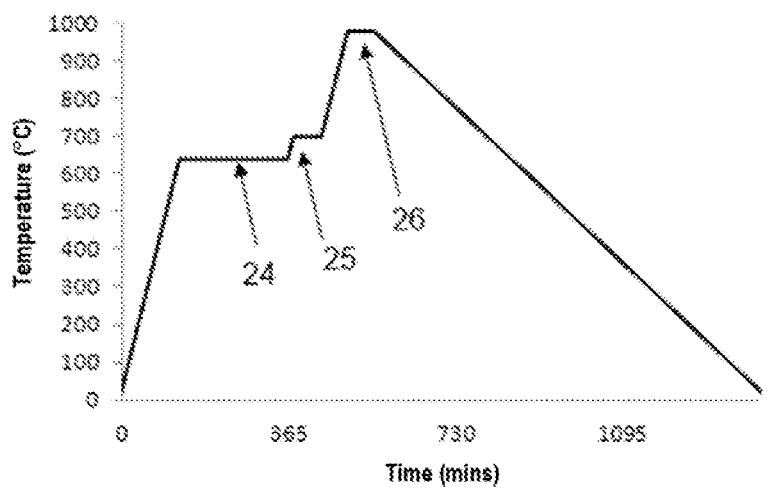
FIG. 2 diagrammatically represents a heat treatment carried out during a process according to one embodiment of the invention.
Figure 3:
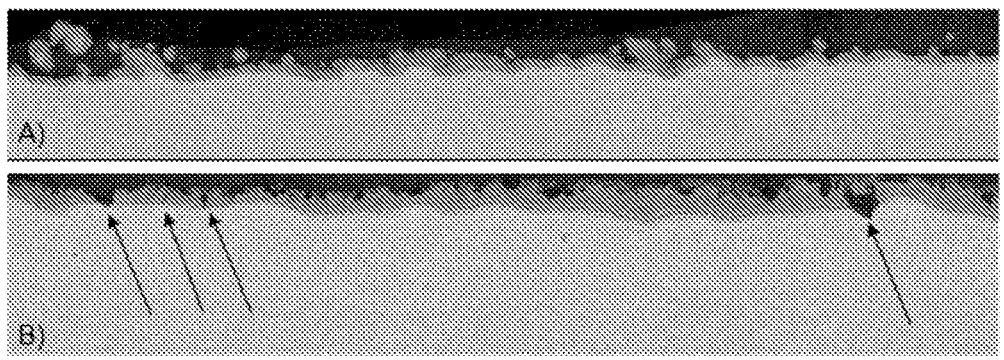
FIG. 3 shows in cross section a coating produced with a process according to the prior art and a coating produced with a process according to one embodiment of the invention.

FIG. 2 diagrammatically represents a heat treatment according to one embodiment of the invention. The stationary phase 24 corresponds to the heating at the first temperature, the stationary phase 25 to the heating at the second temperature and the stationary phase 26 to the heating at the third temperature.

On conclusion of step c) (or of step e) in the case where the process comprises such an additional heat treatment step), a coated substrate is obtained (step d)) which can be used directly in the targeted application.

Preferably, the final coating exhibits a high degree of coverage of the surface to be covered, that is to say a degree of at least 99%, preferably of at least 99.5%, more preferably of at least 99.9% and more preferentially equal to 100%.

Preferably, the final coating exhibits a mean thickness of between 20 and 200 µm, preferably of between 30 and 60 µm. In addition, its thickness is preferably of low variability, that is to say that the coating exhibits variations in thickness not exceeding 10%, preferably not exceeding 5%, in relative standard deviation, the relative standard deviation being defined as the ratio of the standard deviation of the thickness to the mean thickness. In the present patent application, the term "mean thickness" is understood to mean the arithmetic mean of the thickness.

In the context of the invention, the substrate can be a metallic component exhibiting one or more of the following characteristics: a high surface roughness, that is to say a surface roughness of at least 20 µm, surface defects of oxide or unfused type, internal regions which are difficult to access, at least one cavity with a characteristic size of less than or equal to one millimeter or with an equivalent diameter of less than or equal to 1 mm, a cavity or a channel having a high length/width ratio and/or a high length/depth ratio, that is to say a ratio of greater than or equal to 150, preferably of greater than or equal to 300.

In particular, the component can result from an additive manufacturing process, that is to say be obtained by 3D printing, preferably a component resulting from a powder bed laser fusion process.

The substrate is chosen from metallic substrates, in particular substrates formed, in all or part, of iron or of nickel, substrates made of alloy or of superalloy, in particular of alloy or superalloy based on iron or based on nickel, composite substrates comprising one or more metals and/or alloy(s) and/or superalloy(s) containing nickel. In particular, the substrate can comprise at least 90%, preferably at least 95%, by weight of nickel, with respect to the total weight of the particles of metallic material.

The substrate to be coated can in particular be at least a part of a heat exchanger or of an exchanger-reactor. Said exchanger or exchanger-reactor can be used for the production of synthesis gas, that is to say of a mixture of hydrogen and carbon monoxide. Advantageously, the exchanger-reactor according to the invention is of millistructured, indeed even microstructured, type. In other words, the fluid exchange or distribution channels of the millistructured exchanger are of millimetric dimensions, for example with a height and/or a width of the order of 0.2 mm to 2 mm. The structuring and reduction of the fluid passage section in the channels make it possible to intensify the heat and mass transfers during the reaction and the process according to the invention makes it possible to protect the channel surfaces from corrosion phenomena due to the strong carbon activity within these channels. The channels can in particular exhibit a high length/width ratio and/or a high length/depth ratio of greater than or equal to 150, indeed even of greater than or equal to 300.

The substrate can also be chosen from the interior of pipes, turbine blades or storage tanks.

Figure 6:
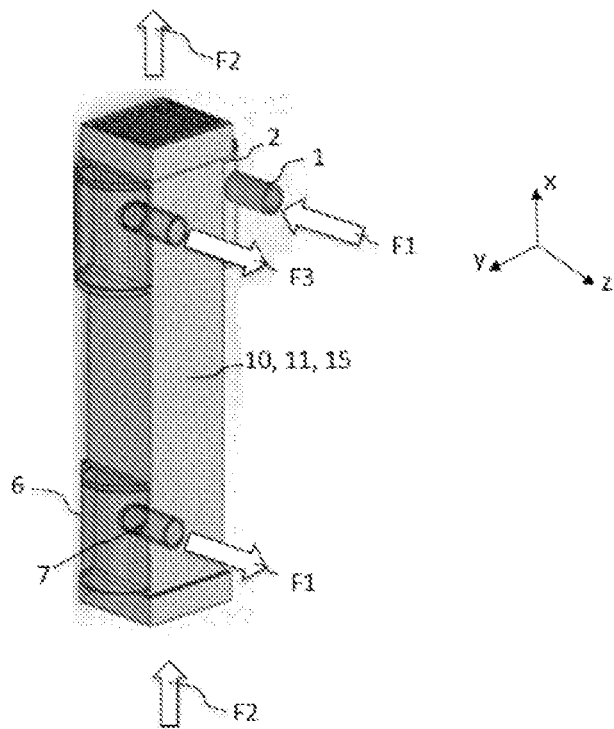
FIG. 6 is a three-dimensional diagrammatic view of an exchanger-reactor according to one embodiment of the invention.

FIG. 6 is a three-dimensional view of an example of an exchanger-reactor which can be used for the implementation of a process for the production of hydrogen by steam reforming which can exhibit, at least in part, a surface coating deposited according to the process of the invention. In operation, a first fluid F1, for example a mixture of methane and steam, enters the exchanger through an inlet connector 2 and exits therefrom through an outlet manifold 6. These manifolds (or heads) are generally provided with inlet and outlet connectors 1 and 7 providing the fluidic connections with the other items of equipment of the production installation.

The exchanger exhibits three dimensions: length, measured along the longitudinal direction x, width, measured along the lateral direction y, and height, measured along the stacking direction z of the walls 12 of the exchanger (not visible in FIG. 1). The exchanger comprises at least a first series of stages 10 and a second series of stages 11 superimposed on one another along the stacking direction z. Preferably, the stages extend substantially parallel to one another and to a plane defined by the x and y directions. Each stage is delimited between two adjacent walls 12, a pair of side edges arranged parallel to the lateral direction y and a pair of longitudinal edges arranged parallel to the longitudinal direction x. Preferably, the walls 12 extend overall parallel to one another and parallel to the longitudinal direction x and to the lateral direction y, said longitudinal and lateral directions being mutually orthogonal.

The manifolds 6, 7 are configured so as to discharge first fluid F1 from all of the stages 10 of the first series and to recover said first fluid F1 from these stages. The manifolds 2, 6 can be welded to the parallelepipedal body of the exchanger or of the exchanger-reactor or else, advantageously, be directly manufactured with the body of the exchanger in order to obtain a component without an assembly interface, preferably by an additive manufacturing process.

A second fluid F2 circulates in the stages 11 of the second series. The second fluid F2 is typically a heat-transfer fluid. It makes it possible, in the case of a process for the reforming of hydrocarbons, such as the steam reforming of methane, to provide the heat supply necessary for the chemical reaction which occurs in the stages 10 where the first reactive fluid F1 circulates.

In addition, the exchanger-reactor according to the invention can comprise a third series of stages 15 inserted between the stages 10, 11 of the first and second series. These stages 15 can be intended in particular for the circulation of a third fluid F3 which is preferably formed by the product of the chemical reaction carried out in the stages 10, preferably hydrogen-rich synthesis gas. Preferably, the exchanger-reactor comprises fluidic connection means connecting at least one stage 10 of the first series with a stage 15 of the third series. The stages 10, 11 of the first and second series can be positioned alternately but not necessarily.

The fluid passes through the exchange zone 4 and is collected in an (outlet) distribution zone 5 arranged downstream of said exchange zone 4. The outlet distribution zone 5 operates hand in hand with the inlet distribution zone 3 and is designed to provide homogeneous recovery of the fluid from the exchange channels 41 of the exchange zone 4. The fluid leaves the body of the exchanger or of the exchanger-reactor through an outlet head 6 through the outlet connector 7.

Figure 7:
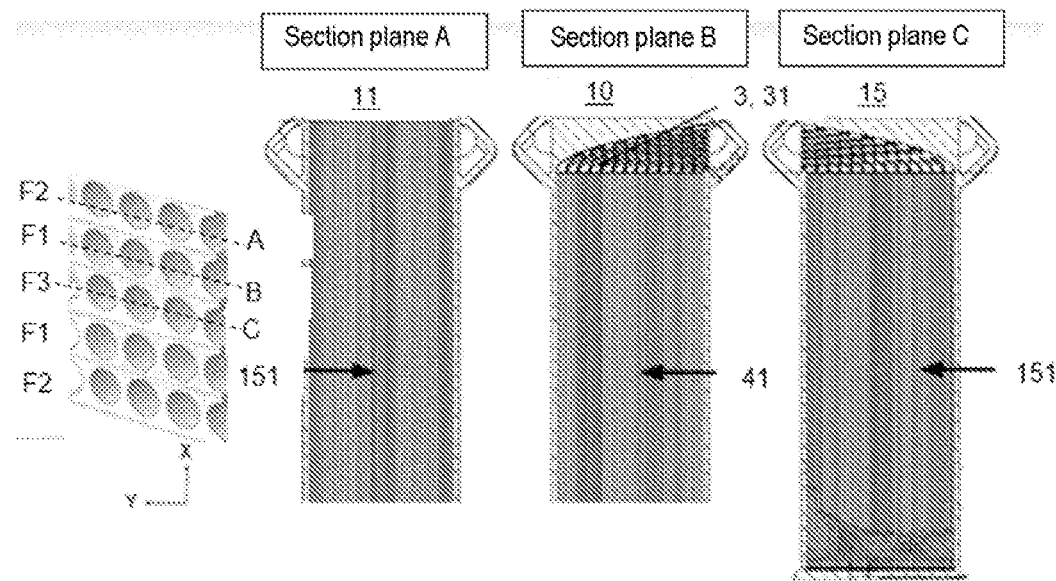
FIG. 7 diagrammatically represents different section planes of the exchanger-reactor of FIG. 6.

FIG. 7 is a partial exploded view of three types of stages 10, 11, 15 which are intended to be superimposed in an exchanger-reactor according to FIG. 6. Preferably, each stage 10, 15 of the third series is also divided, along the longitudinal direction x, into a circulation zone comprising circulation channels 41, 151, which are preferably rectilinear, and at least one distribution zone comprising distributing channels 31, 155. The inlet distribution zones 3 and is designed to provide homogeneous recovery of the fluid from the exchange channels 41 of the exchange zone 4. Preferably, each stage 11 of the second series also comprises rectilinear circulation channels 111 which extend parallel to the longitudinal direction x.

According to another possibility, the deposition process is intended to coat at least a part of a turbine.

EXAMPLES

Example 1

A suspension with a volume of 200 ml comprising 67% of powder, with respect to the total weight of the suspension, that is to say exhibiting a powder/liquid ratio by weight of approximately 2, was prepared from 24 g of ethanol, 37.8 g of aluminum particles and 10.1 g of powdered halogenated compound of the $K_yAlF_x$ type as pickling agent, i.e. a metallic material/pickling agent ratio by weight of 3.74. The pickling agent particles exhibited a mean equivalent diameter of 4 μm and a purity of the order of 99.99%, with respect to the total weight of pickling agent particles. The aluminum particles exhibited a mean equivalent diameter of 11.4 μm, a sphericity factor of 0.55 and a purity of the order of 99.95%.

The suspension was synthesized in a single step using a sonotrode with a power of 160 W. The two types of particles were introduced into a container and then the ethanol was added. The suspension was subsequently agitated using the sonotrode with an amplitude of 100% for a period of time of 12 s. The suspension was kept under agitation.

The deposition of the suspension was carried out in 2 successive steps: (1) immersion of the components to be coated in the suspension at ambient temperature, then withdrawal with a constant speed of 8 mm/s, (2) continuous drawing at a constant speed of 8 mm/s. The thickness of the deposit obtained was approximately 80 μm. The thickness was monitored by optical microscopy on several control samples.

Subsequently, the coated components were placed in a vacuum oven where the heat treatment corresponding to step c) and to FIG. 2 was carried out.

Figure 4:
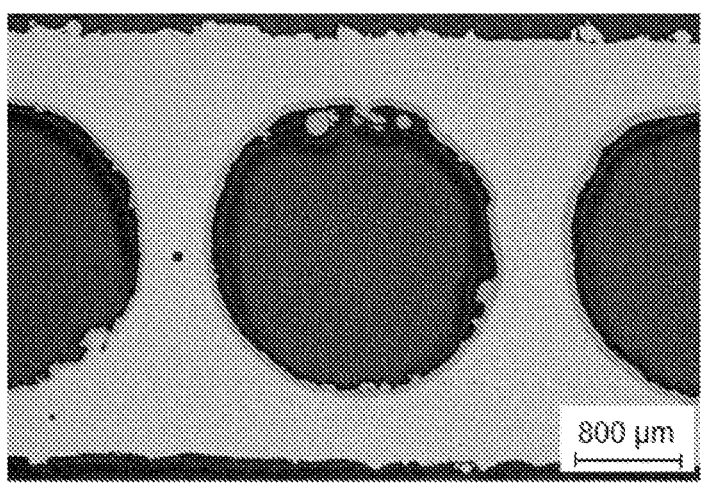
FIG. 4 shows in cross section a coating produced on internal surfaces of a component with a process according to one embodiment of the invention.

FIG. 4 shows the cross-sectional view of the final coating obtained at the internal surface of a component of complex geometry. The mean thickness of the coating is of the order of 50 μm and no uncoated zone can be detected.

Example 2

A suspension with a volume of 200 ml comprising 50% of powder, with respect to the total weight of the suspension, that is to say exhibiting a powder/liquid ratio by weight equal to 1, was prepared from the following ingredients: 48 g of ethanol, 37.8 g of aluminum powder and 10.1 g of powdered halogenated compound of the $K_yAlF_x$ type as pickling agent, i.e. a metallic material/pickling agent ratio by weight of 3.74.

The pickling agent particles exhibited a mean equivalent diameter of 4 μm and a purity of the order of 99.99%, with respect to the total weight of pickling agent particles. The aluminum particles exhibited a mean equivalent diameter of 11.4 μm and a purity of the order of 99.95%.

The suspension was synthesized in a single step using a sonotrode with a power of 160 W. The two types of particles were introduced into a container and then the ethanol was added. The suspension was subsequently agitated using the sonotrode with an amplitude of 100% for a period of time of 12 s. The suspension was kept under agitation.

The deposition of the suspension is carried out in 2 successive steps: (1) injection of the suspension into the internal cavities of a component to be coated at a flow rate of 60 ml·min$^{-1}$, (2) withdrawal of the suspension at a flow rate of 60 ml·min$^{-1}$. The thickness of the deposit obtained is approximately 40 μm. The thickness was monitored by optical microscopy on several control samples.

Subsequently, the coated components were placed in a vacuum oven where the heat treatment corresponding to step c) and to FIG. 2 was carried out.

Figure 5:
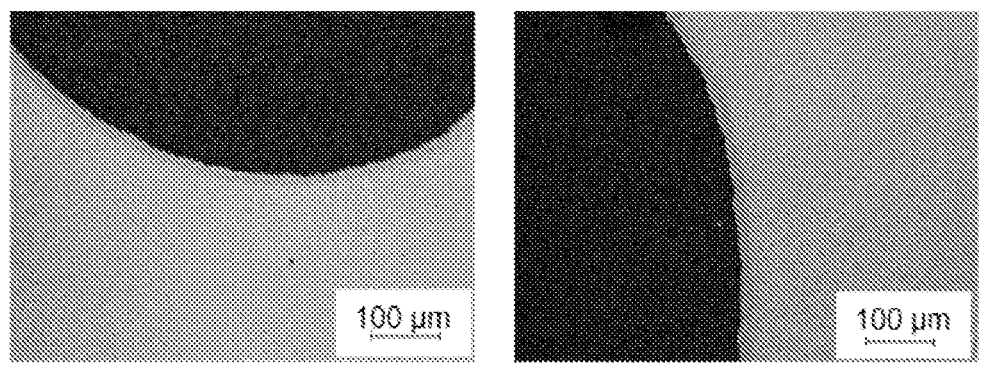
FIG. 5 shows in cross section a coating produced on internal surfaces of another component with a process according to one embodiment of the invention.

FIG. 5 shows the cross-sectional view of the final coating obtained at the internal surface of a component of complex geometry. The mean thickness of the coating is of the order of 25 μm and no uncoated zone can be detected.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for the deposition of a coating on at least a part of a metallic substrate, said process comprising the following successive steps:
 a) mixing a liquid and a powder comprising particles of a metallic material to be deposited and particles of a pickling agent, thereby preparing a suspension,
 b) application of the suspension prepared in step a) to at least a part of the surfaces of the metallic substrate, thereby obtaining a substrate-suspension assembly,
 c) carrying out a heat treatment of the substrate-suspension assembly which comprises heating at a first temperature of at least 500° C. and heating at a second temperature which is greater than the first temperature, and
 d) recovery of a substrate coated, at least in part, with a coating,
 said pickling agent being a halogenated compound and the suspension comprising from 10% to 60% by weight of said pickling agent, with respect to the total weight of the powder, wherein the particles of the metallic material exhibit a first mean equivalent diameter and the particles of the pickling agent exhibit a second mean equivalent diameter, the ratio of the first mean equivalent diameter to the second mean equivalent diameter being between 1.2 and 10.

2. The process as claimed in claim 1, wherein the suspension comprises from 20% to 30% by weight of said pickling agent, with respect to the total weight of the powder.

3. The process as claimed in claim 1, wherein the powder contains solely particles of the metallic material and particles of the pickling agent.

4. The process as claimed in claim 1, wherein the particles of the metallic material exhibit a first mean equivalent diameter and the particles of the pickling agent exhibit a second mean equivalent diameter, the ratio of the first mean equivalent diameter to the second mean equivalent diameter being between 3.5 and 7.5.

5. The process as claimed in claim 4, wherein the particles of the metallic material exhibit a first particle size distribution centered around the first mean equivalent diameter and the particles of the pickling agent exhibit a second particle size distribution centered around the second mean equivalent diameter, said first particle size distribution and/or said second particle size distribution exhibiting a dispersion index of less than 1.2.

6. The process as claimed claim 1, wherein the particles of the metallic material exhibit a first mean equivalent diameter of between 7 and 15 μm and/or the particles of the pickling agent exhibit a second mean equivalent diameter of between 2 and 6 μm.

7. The process as claimed in claim 1, wherein the particles of the suspension exhibit a mean sphericity factor of at least 0.3.

8. The process as claimed in claim 1, wherein the metallic substrate exhibits at least one cavity of equivalent diameter $e_{mm}$<2 mm and/or a length/width ratio of greater than 150, the particles of the suspension each exhibiting an equivalent diameter of less than $e_{mm}/10$.

9. The process as claimed in claim 1, wherein the ratio by weight of the powder to the liquid is between 1.5 and 3.

10. The process as claimed in claim 1, wherein the pickling agent is a halogenated compound, the halogen of which is fluorine or chlorine.

11. The process as claimed in claim 1, wherein the pickling agent belongs to the system of fluorinated compounds, said pickling agent chosen from the group consisting of $K_xAlF_y$, $NH_4F$, $MgF_2$ and $CaF_2$, with x between 1 and 3.

12. The process as claimed in claim 1, wherein the liquid comprises an alcohol.

13. The process as claimed in claim 1, wherein the metallic material comprises aluminum or an aluminum alloy.

14. The process as claimed in claim 1, wherein, in step c), heating is carried out at a first temperature of between 500° C. and 700° C. for 1 to 4 hours and heating is carried out at a second temperature of between 900° C. and 1100° C. for 1 to 3 hours.

15. The process as claimed in claim 1, wherein stage c) is carried out under an inert or reducing atmosphere or under vacuum.

16. The process as claimed in claim 1, further comprising, between steps c) and d), a step e) carrying out, under an oxidizing atmosphere, an additional heat treatment with heating at a third temperature of between 900° C. and 1100° C. for 1 to 5 hours.

17. The process as claimed in claim 1, wherein the substrate to be coated is a metallic component exhibiting a surface roughness of at least 20 µm and/or surface defects of oxide or unfused type.

18. The process as claimed in claim 1, wherein the substrate to be coated is a component resulting from an additive manufacturing process.

\* \* \* \* \*